(12) United States Patent
Chen

(10) Patent No.: US 6,741,261 B2
(45) Date of Patent: May 25, 2004

(54) ALPHA-CHANNEL COMPOSITING SYSTEM

(75) Inventor: Yu-Ling Chen, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 09/780,467

(22) Filed: Feb. 12, 2001

(65) Prior Publication Data

US 2001/0052906 A1 Dec. 20, 2001

(30) Foreign Application Priority Data

Feb. 29, 2000 (AU) .............................................. PQ5931

(51) Int. Cl.$^7$ ................................................ G09G 5/02
(52) U.S. Cl. ...................................................... 345/592
(58) Field of Search ................. 345/419, 592, 345/593

(56) References Cited

U.S. PATENT DOCUMENTS 6,271,850 B1 * 8/2001 Kida et al. .................. 345/419

* cited by examiner

*Primary Examiner*—Matthew Luu
(74) *Attorney, Agent, or Firm*—Fitzpatrick, Cella, Harper & Scinto

(57) ABSTRACT

A compositing system (300) that comprises an optimized alpha-channel compositing module (303) is disclosed. The compositing system (300) optimizes the range correction in the alpha-channel compositing module (303) by using a constant divider (401) and delaying the correction of an alpha value until after the summation of the alpha values from all contributing regions. Uncorrected opacity values are used to index a look-up table in order to reduce the data processing path to a multiplier (407) for processing after premultiplication of a color values from all contributing regions.

22 Claims, 8 Drawing Sheets

ALPHA-CHANNEL COMPOSITING SYSTEM

TECHNICAL FIELD OF THE INVENTION

The present invention relates generally to the rendering of graphical elements into raster pixel images and, in particular, to the efficient rendering of such elements to pixel image data using alpha-channel compositing. The invention also relates to a computer program product including a computer readable medium having recorded thereon a computer program for the efficient rendering of graphical elements to pixel image data using alpha-channel compositing.

BACKGROUND ART

Computer generated images are typically made up of many differing components or graphical elements which are rendered and composited together to create a final image. In recent times, "alpha values" have been used in order to assist in the rendering of images. The colour associated with each element in an image is given an alpha value representing the contribution of the element to a final pixel value. An element with an alpha value of zero is typically understood to be fully transparent and an element with an alpha value of one is typically understood to be fully opaque. The alpha value is typically stored alongside each instance of a colour. Therefore, along with the RGB (Red, Green, Blue) values of a pixel, there is an alpha value representing the coverage of the pixel. The collection of all of the alpha values for an image is often called an "alpha channel" (also known as a "matte", an "opacity channel", or simply "opacity").

The combining of source colour and opacity with destination colour and opacity will now be described with reference to FIG. 1. As seen in FIG. 1, when a source pixel 100 and destination pixel 101 are composited together, the pixels 100, 101 are conceptually overlaid, so that they anti-correlate to give four regions (i.e. three non-transparent regions 103, 105, 107 and one transparent region 111) in the combined resultant pixel 109. The three non-transparent regions 103, 105 and 107, can be defined as SOUTD (ie. source outside destination), SROPD (i.e. source intersect destination) and DOUTS (i.e. destination outside source), respectively. The colour value of each of these three regions is calculated conceptually independently. The source outside destination region 103 takes it's colour directly from the source colour. The destination outside source region takes it's colour directly from the destination colour. The source intersect destination region 105 takes it's colour from a combination of the source and destination colour. Each of the three regions 103, 105 and 107 contributes a proportion of it's colour to the final colour of a resultant pixel according to the opacity value of that particular region. The opacity contribution from each of the three regions 103, 105, 107 can be defined as below, where $\alpha$ represents the opacity value between 0 and 1 for the 'src' (i.e. source) and 'dest' (i.e. destination) pixel:

$$\text{SOUTD} = \alpha src(1 - \alpha dest); \quad (1)$$

$$\text{DOUTS} = \alpha dest(1 - \alpha src); \text{ and} \quad (2)$$

$$\text{SROPD} = \alpha src \alpha dest. \quad (3)$$

The process of combining source and destination colour is termed a raster operation and is one of a set of functions specified by raster operation code used in conjunction with many alpha-compositing systems employed by computer graphics systems. The alpha value, $\alpha$, for a particular pixel is typically represented as an 8 bit word in the range 0 to 255, representing the range between zero and one (i.e. normalised). As a result, the product of the multiplication of the source and destination pixels has to be 'range corrected' (i.e. divided by 255) to return to an 8-bit word representing the range between 0 and 1 for the resultant pixel.

FIG. 2 is a schematic diagram of a prior art alpha-compositing module 200 employed by a computer graphics system in order to combine source colour and opacity with destination colour and opacity. The module 200 comprises an opacity combination system 202 and a colour combination system 205. The opacity combination system 202 and the colour combination system 205 calculate the resultant pixel opacity and colour values, respectively. The $C_{src}$, $C_{dest}$ and $C_{result}$ operands represent the colour of the source, destination and resultant (i.e. 'result') pixels, respectively. The $\alpha_{src}$, $\alpha_{dest}$ and $\alpha_{result}$ operands represent the opacity value of the source, destination and resultant (i.e. 'result') pixels, respectively. The contributions from the three regions, SOUTD, SROPD and DOUTS due to the compositing of the source and destination pixels, are controlled by three opacity flags, USE_SOUTD, USE_SROPD, and USE_DOUTS, respectively. If the flag for a region is set, there is some contribution from that region, otherwise, the contribution from that particular region is zero.

The module 200 of FIG. 2 uses an 8-bit word to represent the alpha value for a particular pixel. Therefore, the opacity contribution from each region has to be range corrected by being divided by the number 255, using dividers 210, 220 and 230. The resultant opacity is calculated by summing the three range corrected opacity values for the three regions SOUTD, SROPD and DOUTS, using a summer 201. The resultant colour $C_{result}$ is divided by the resultant opacity, using a divider 240. As conceptually seen from FIG. 2, there is a long processing path from the initial colour and opacity operands to the resultant colour and opacity and typically the destination operand is taken from a compositing stack which contains the result of a previous operation. Therefore, it is not possible to pipeline such an operation and simplifying the data path while maintaining the precision is very important.

DISCLOSURE OF THE INVENTION

It is an object of the present invention to substantially overcome, or at least ameliorate, one or more disadvantages of existing arrangements.

According to one aspect of the present invention there is provided an apparatus for compositing first and second pixel values, said apparatus comprising:

logic means for calculating combined range uncorrected colour and opacity values using opacity and colour values for each of said first and second pixel values;

selection means for selecting a reciprocal range uncorrected opacity value from a plurality of predetermined reciprocal range uncorrected opacity values using said combined range uncorrected opacity value;

multiplier means for multiplying said reciprocal range uncorrected opacity value with said combined range uncorrected colour value to determine a final range corrected resultant colour value for a third pixel; and divider means for dividing said combined range uncorrected opacity value by a predetermined number wherein said divider means is configured to calculate a final range corrected resultant opacity value for said third pixel.

According to another aspect of the present invention there is provided apparatus for compositing first and second pixel values, said apparatus comprising:

a plurality of inputs for receiving opacity and colour values for each of said first and second pixels;

logic means for calculating combined range uncorrected colour and opacity values using said opacity and colour values;

selection means for selecting a reciprocal range uncorrected opacity value from a plurality of predetermined reciprocal range uncorrected opacity values using said combined opacity value;

multiplier means for multiplying said reciprocal range uncorrected opacity value with said combined range uncorrected colour value to produce a final range corrected resultant colour value for a third pixel; and divider means for dividing said range uncorrected combined opacity value by a predetermined number, wherein said divider means is configured to calculate a final range corrected resultant opacity value for said third pixel.

According to still another aspect of the present invention there is provided a method of compositing first and second pixel values, said comprising the steps of:

inputting opacity and colour values for each of said first and second pixels;

calculating combined range uncorrected colour and opacity values using said opacity and colour values;

selecting a range uncorrected reciprocal opacity value from a plurality of predetermined range uncorrected reciprocal opacity values using said combined range uncorrected opacity value;

multiplying said range uncorrected reciprocal opacity value with said combined range uncorrected colour value to produce a final resultant range corrected colour value for a third pixel; and dividing said combined range uncorrected opacity value by a predetermined number to produce a final resultant range corrected opacity value for said third pixel, wherein said final resultant range corrected opacity value for said third pixel is determined subsequent to said combined range uncorrected opacity value being calculated.

According to still another aspect of the present invention there is provided a computer readable medium, having a program recorded thereon, where the program is configured to make a computer execute a procedure to composite first and second pixel values, said program comprising:

code for inputting opacity and colour values for each of said first and second pixels;

code for calculating combined range uncorrected colour and opacity values using said opacity and colour values;

code for selecting a range uncorrected reciprocal opacity value from a plurality of predetermined range uncorrected reciprocal opacity values using said combined range uncorrected opacity value;

code for multiplying said range uncorrected reciprocal opacity value with said combined range uncorrected colour value to produce a final resultant range corrected colour value for a third pixel; and code for dividing said combined range uncorrected opacity value by a predetermined number to produce a final resultant range corrected opacity value for said third pixel, wherein said final resultant range corrected opacity value for said third pixel is determined subsequent to said combined range uncorrected opacity value being calculated.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
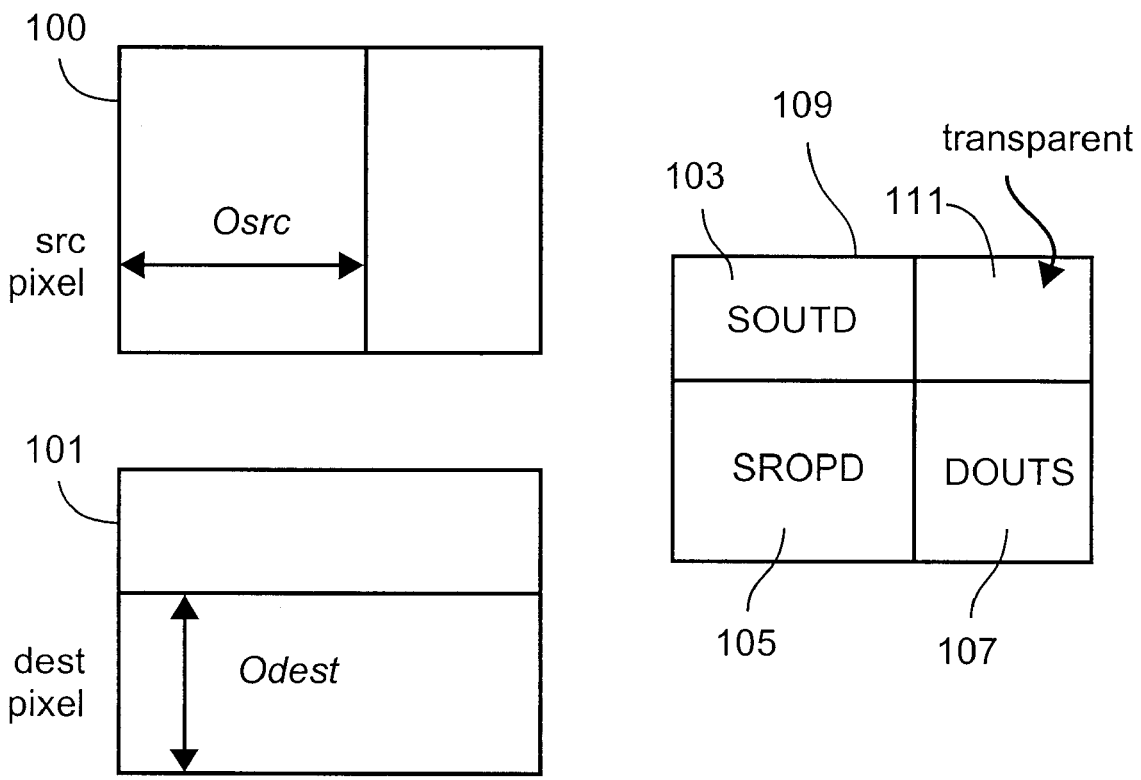
FIG. 1 shows the regions formed by compositing a source pixel and a destination pixel.
Figure 2:
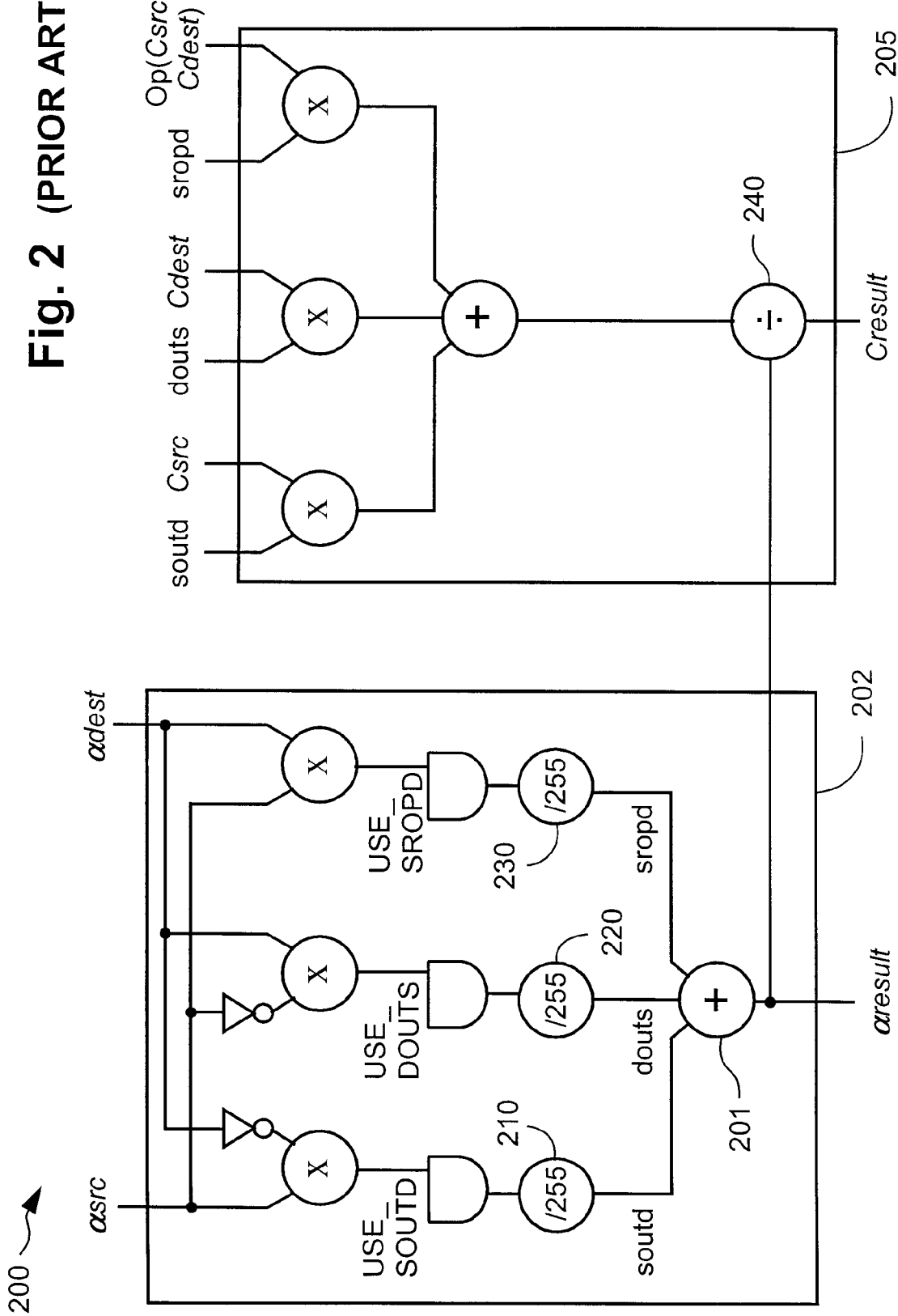
FIG. 2 is a schematic diagram of a prior art alpha-compositing module employed by a computer graphics system.

Where reference is made in any one or more of the accompanying drawings to steps and/or features, which have the same reference numerals, those steps and/or features have for the purposes of this description the same function (s) or operation(s), unless the contrary intention appears.

The preferred embodiment is a compositing system that comprises an optimised alpha-channel compositing module. The preferred embodiment optimises the range correction in the alpha-channel compositing module by using a constant divider and delaying the correction of an alpha value until after the summation of the alpha values from all contributing regions. Uncorrected opacity values are used to index a look-up table in order to reduce the data processing path to a multiplier for processing after premultiplication of a colour values from all contributing regions.

Figure 3:
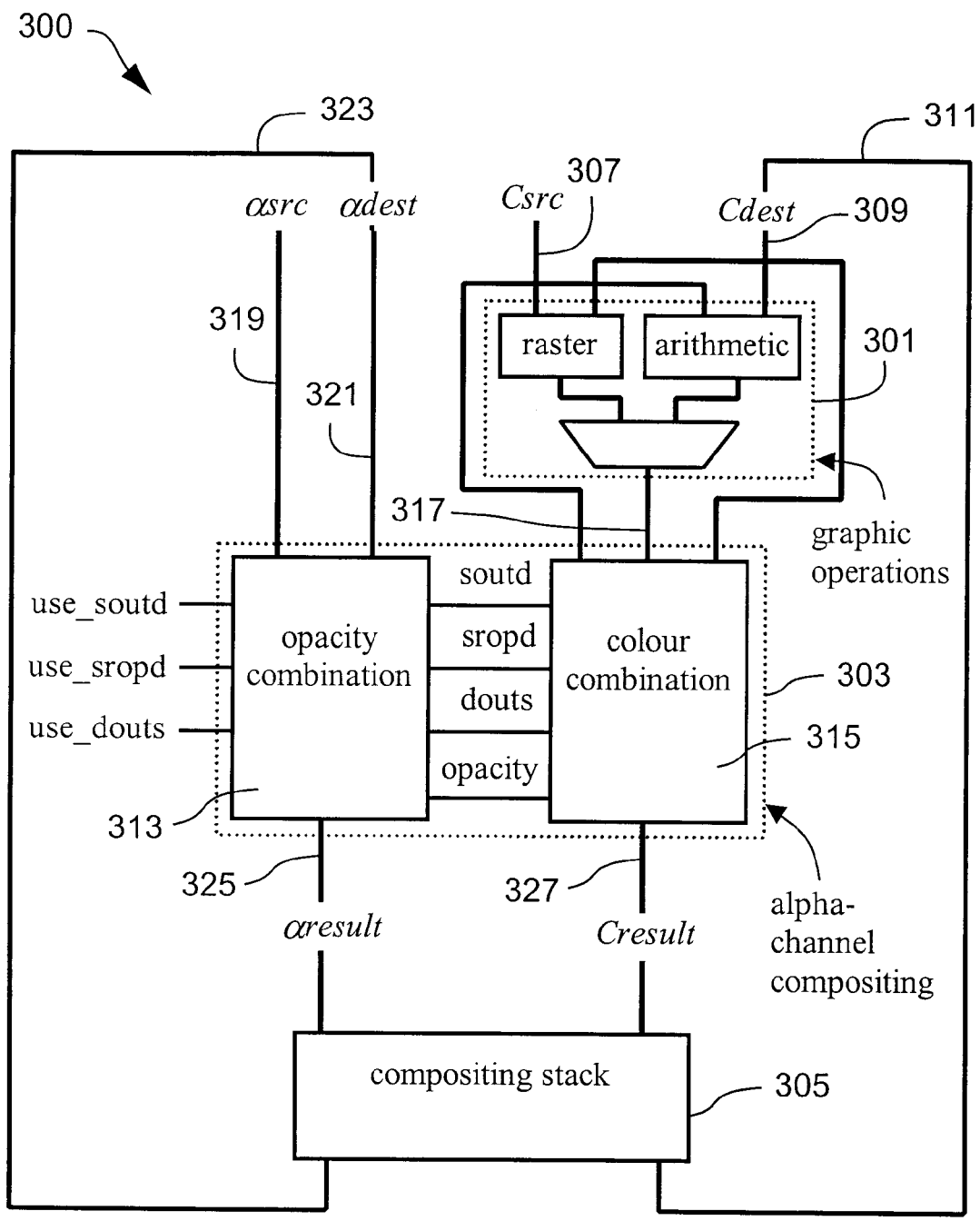
FIG. 3 is a schematic diagram of a compositing system in accordance with the preferred embodiment of the present invention.

FIG. 3 is a schematic diagram of the compositing system 300 in accordance with the preferred embodiment of the present invention. The compositing system 300 includes a graphic operation module 301, an optimised alpha-compositing module 303 and a compositing stack 305. The graphic operations module 301 includes two inputs 307 and 309. The input 307 accepts the colour values of the source pixel and the input 309 accepts the colour values of the destination pixel operands (i.e $C_{src}$ and $C_{dest}$). The graphic operations module 301 applies raster and arithmetic operations on the source and destination colour values for the source and destination pixels. The colour values of the destination pixel are taken from the compositing stack 305, via line 311. The result of the raster and arithmetic operations is passed to the alpha-channel compositing module 303, via line 317, in order to calculate the resultant pixel colour value.

The alpha-channel compositing module 303 calculates the resultant pixel opacity and colour values and passes the values to the compositing stack 305, via lines 325 and 327 respectively. The compositing stack 301 is used for the storage of intermediate opacity and colour results. The alpha channel compositing module 303, includes an opacity combination system 313 and a colour combination system 315. The opacity combination system 313 and the colour combination system 315 calculate the resultant pixel opacity and colour value, respectively. The opacity combination system 313 has two inputs 319 and 321. The input 319 accepts the alpha value of the source pixel. The input 321 accepts the alpha value of the destination pixel. The alpha value for the destination pixel is taken from the compositing stack 305, via line 323.

Figure 4:
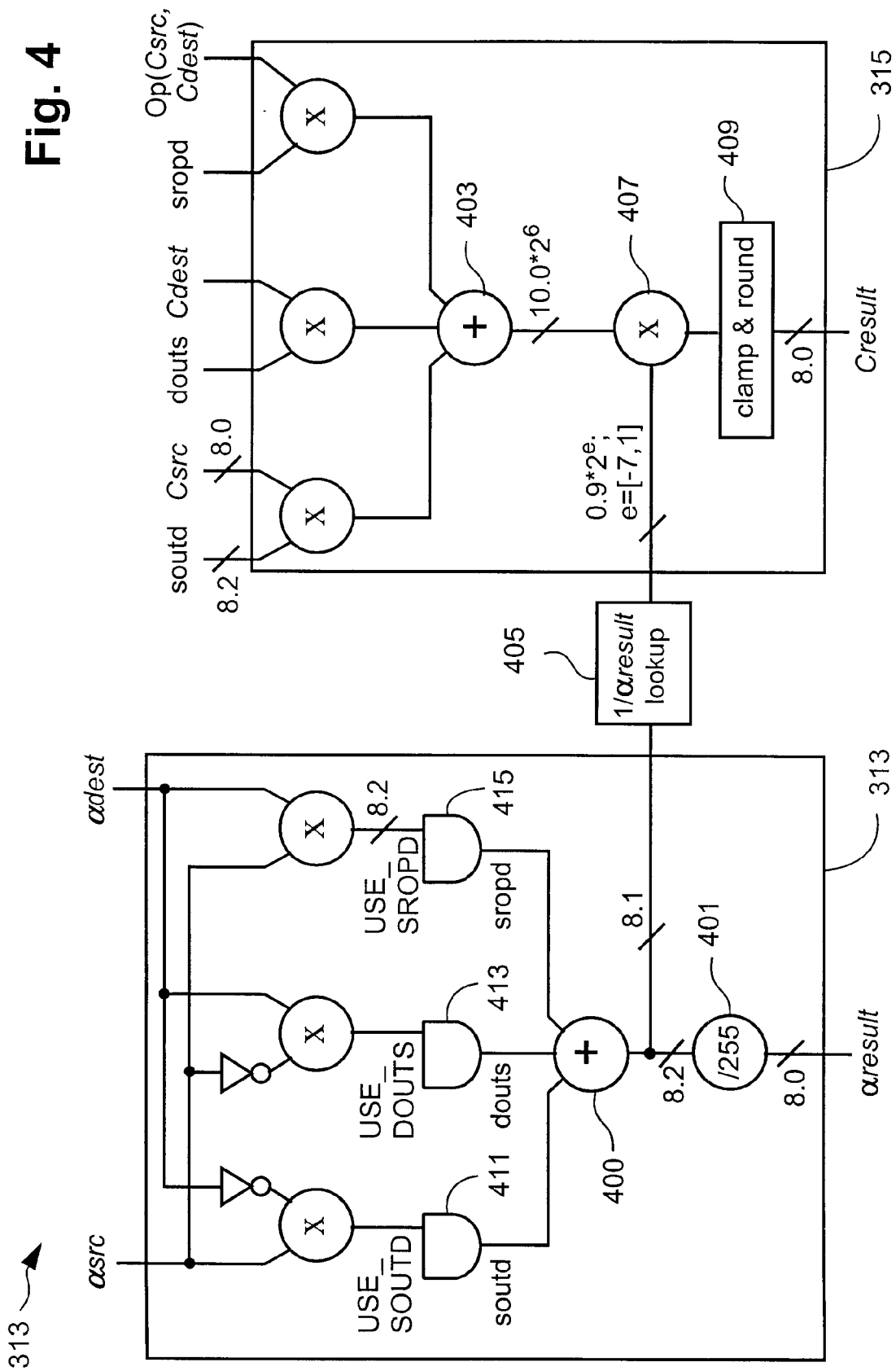
FIG. 4 is a schematic diagram showing an alpha-channel compositing module in used in the compositing system of FIG. 3.

FIG. 4 is a schematic diagram showing the alpha-channel compositing module 303 of the preferred embodiment in more detail. αsrc and αdest are preferably 8-bit words representing the opacity range between 0 and 1 for the source and destination pixels, respectively. Therefore, as with the prior art compositing module 200, since the alpha compositing module 303 of the preferred embodiment uses an 8-bit word to represent the alpha value for a particular pixel, the product of the multiplication of the alpha values for the source and destination pixels has to be divided by 255 to return to an 8-bit word representing the alpha value of the resultant pixel. However, the range correction process, in accordance with the preferred embodiment, has been optimised by delaying the correction of the opacity contribution from each of the three regions SOUTD, DOUTS and SROPD, until after the summation of the opacity contribution from each of the three regions.

As can be seen in FIG. 4, the contributions from the three regions (i.e. SOUTD, SROPD and DOUTS) are preferably controlled by the three flags (i.e. USE_SOUTD, USE_DOUTS, and USE_SROPD) using three 'and' gates 411, 413 and 415. The total combined opacity contribution for each of the three regions SOUTD, DOUTS and SROPD, is determined using the summer 400 to give a resultant opacity value, $\alpha_{result}$. The resultant opacity value is then range corrected by dividing the resultant opacity value by 255 using the divider 401. Therefore, in accordance with the preferred embodiment, the three range corrections of the prior art are reduced to only one.

The total combined colour contribution from each of the three regions SOUTD, DOUTS and SROPD, is preferably determined using the adder 403. The resultant colour value $C_{result}$ is again calculated by dividing the total colour contributions from each of the three regions SOUTD, DOUTS and SROPD, by the resultant opacity value, $\alpha_{result}$. However, in accordance with the preferred embodiment, the division is implemented as a multiplication by the reciprocal of the divider (i.e. opacity). The reciprocals of a range of uncorrected resultant opacity values are preferably predetermined and stored in a look-up table 405. The uncorrected opacity value is preferably used to index the look-up table 405 to select the correct reciprocal which is then multiplied by a value representing the sum of the colour contributions from each of the three regions SOUTD, DOUTS and SROPD, using a multiplier 407. The output of the multiplier 407 is then clamped and rounded using a process module 409 in order to calculate the resultant colour value $C_{result}$.

As discussed above, the preferred embodiment preferably uses an 8-bit word for each alpha channel. Using the three opacity flags flags (i.e. USE_SOUTD, USE_DOUTS, and USE_SROPD), the opacity contribution from each of the three regions SOUTD, SROPD and DOUTS, can be rewritten as equations (4), (5) and (6) (N.B. equations (4), (5) and (6) are written using C syntax). The resultant opacity $\alpha_{result}$ is a summation of the opacity contribution from each of the three regions and is represented by equation (7).

$$soutd=(USE\_SOUTD)?(Osrc*(255-Odest))/255:0; \quad (4)$$

$$douts=(USE\_DOUTS)?(Odest*(255-Osrc))/255:0; \quad (5)$$

$$sropd=(USE\_SROPD)?(Osrc*Odest)/255:0; \text{ and} \quad (6)$$

$$\alpha result=soutd+douts+sropd. \quad (7)$$

As discussed above, each of the regions, SOUTD, DOUTS and SROPD, contributes a proportion of colour to a resultant pixel colour according to the alpha value of that particular region. For example, the colour of the region SROPD is determined from the resultant colour of a raster and/or an arithmetic operation on the source and destination pixel colours. The colour of a resultant pixel is defined as equation (8) below. The colour of the resultant pixel has to be unpremultiplied before being pushed onto the compositing stack 305.

$$Oresult*Cresult=(Op(Csrc, Cdest)*sropd+Csrc*soutd+Cdest*douts) \quad (8)$$

Figure 5:
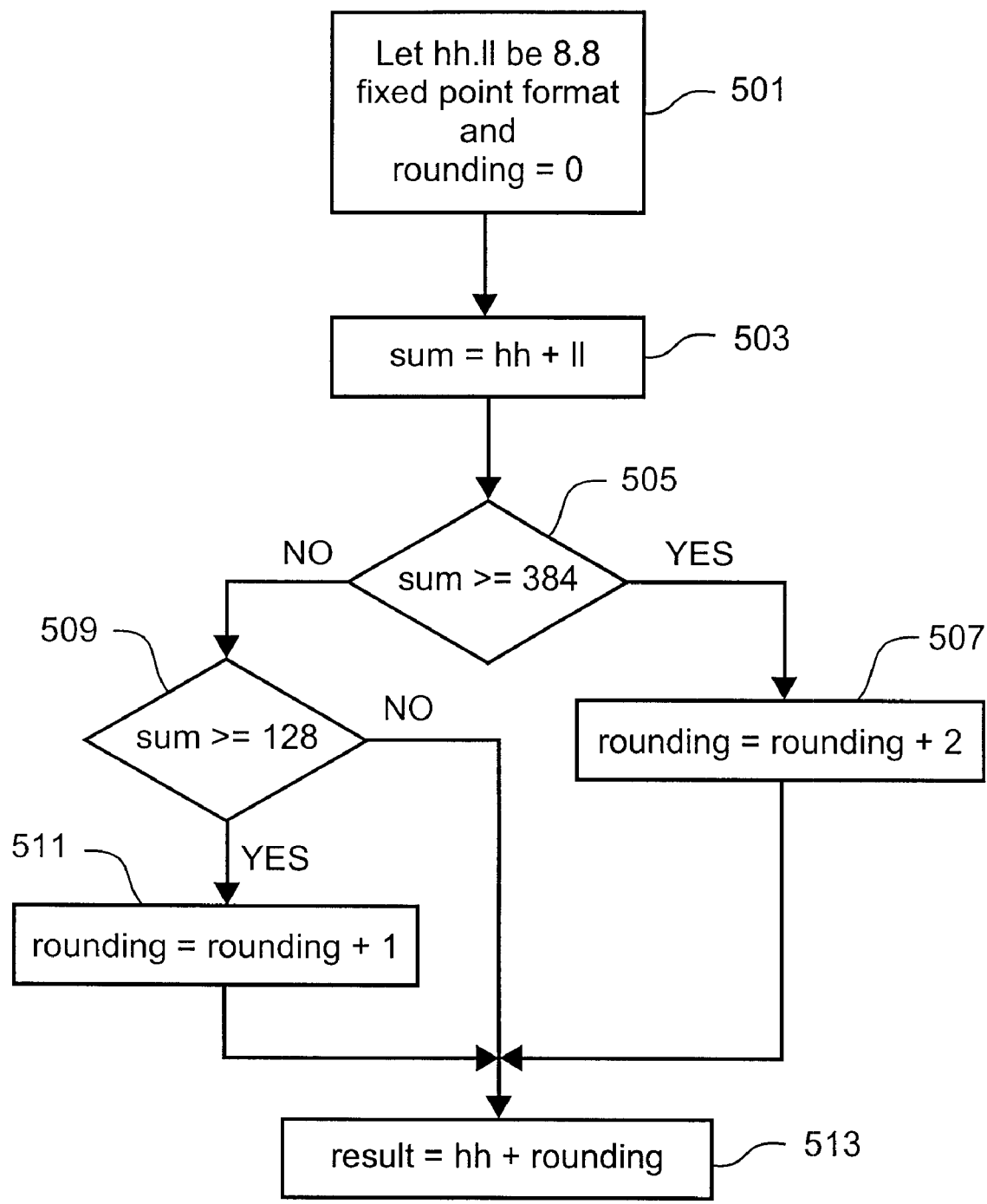
FIG. 5 is a flowchart showing a method of dividing a resultant opacity value, $\alpha_{result}$, by 255 in accordance with the preferred embodiment.

As discussed above, the resultant opacity, $\alpha_{result}$, is range corrected to 8-bits through being divided by 255, using the divider 401. FIG. 5 is a flowchart showing the method of dividing the resultant opacity, $\alpha_{result}$, by 255 in accordance with the preferred embodiment. The process begins at step 501, where the value representing the uncorrected opacity value is preferably set to an 8.8 fixed-point format. The value representing the uncorrected opacity value can be represented as a sixteen-bit number, in the form "hh.ll", whereby h and l are four bit binary numbers representing the integer part and fractional part of the uncorrected opacity value, respectively. Also at step 501, a rounding variable "rounding" is set to zero. At the next step 503, the integer part and fractional part of the uncorrected opacity value are added together. The process continues to the next step 505, where if the result of the addition at step 503 is greater than or equal to 384, the process proceeds to the next step 507. Otherwise, the process continues to step 509. At step 507, the rounding variable is incremented by two. At step 509, if the result of the addition at step 503 is greater than or equal to 128, the process proceeds to the next step 511. Otherwise, the process continues to step 513. At step 511, the rounding variable is incremented by one. The process concludes at the next step 513, where the range corrected opacity value is calculated by adding the integer part of the uncorrected opacity value to the value of the rounding variable. Alternatively, if the input is less than 16 bits (eg. 10 bits in 8.2 format), the missing bits can be replaced with zeros at step 501.

Figure 8:
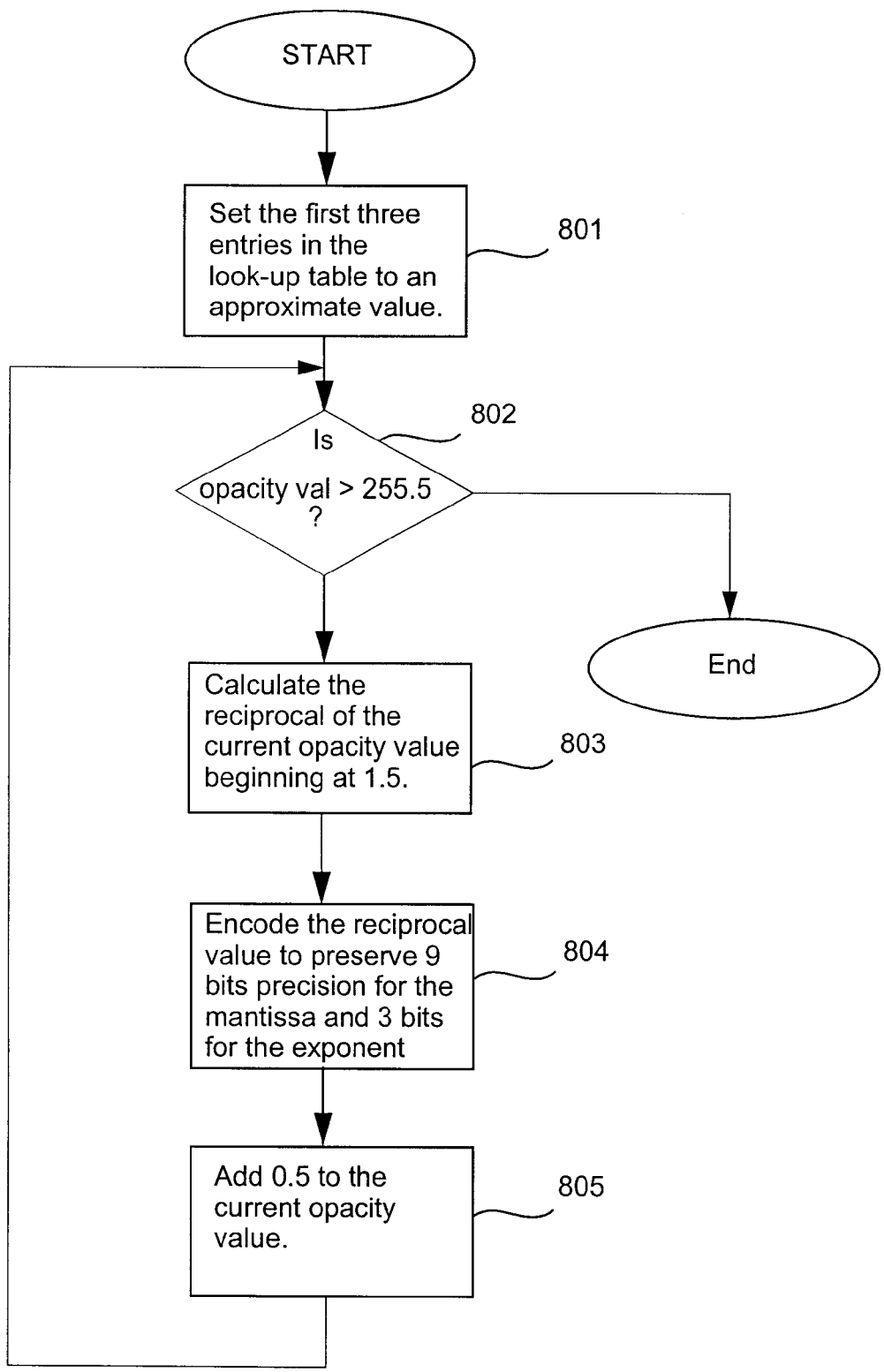
FIG. 8 is a flowchart showing a method of building the look-up table in accordance with the preferred embodiment.

The look-up table 405 preferably stores the reciprocals of a range of resultant opacity values in floating point format to provide better precision. The look-up table 405 preferably has 512 entires where the opacity value is incremented in steps of 0.5 in the range [0,255]. Each entry in the look-up table 405 preferably has a 9 bit mantissa and 3 bit exponent in 0.9×2e format. Each entry is preferably indexed by 9 bits opacity of 8.1 format where e has the range [−7,1] and is encoded to [0,7]. FIG. 8 is a flowchart showing a method of building the look-up table 405 in accordance with the preferred embodiment. The process of building the look-up table 405 begins at the first step 801, where the first three entries in the look-up table 405 are set to an approximate value representing the reciprocal of a corresponding opacity value (i.e. 0, 0.5 or 1). The first three entries will generally have an error due to limited table width. However, the error can be ignored since the opacity is very small and the resultant colour will be close to zero. At the next step 802, a check is performed to determine if the resultant opacity value, Oresult, is greater than 255.5. If Oresult is less than or equal to 255.5, at step 802, then the process proceeds to step 803 where the reciprocal of the corresponding opacity value is calculated beginning at an opacity value equal to 1.5. The reciprocal value calculated at step 802 is scaled and rounded up to 16 bits. At the next step 804, the reciprocal value is encoded to ensure that the calculated reciprocal value has a 9 bit mantissa and a 3 bit exponent in 0.9×2e format. The process continues at the next step 805, where 0.5 is added to the current resultant opacity value, Oresult, and the process returns to step 802. The process concludes at step 802 when the current resultant opacity value exceeds 255.5.

The look-up table 405 can be built using the following C code:

```
int m[512]; //mantissa
int e[512]; //exponent
// set the first three entries to an approximate value, as the range is not
// enough to present these.
m[0] = 0;
e[0] = 0;
m[1] = 0x1FF;
e[1] = 7;
m[2] = 0x1FF;
e[2] = 7;
for (int i = 3; i <= 511; i++) // loop from 1.5 to 255.5 in 0.5 step
{
    float j = i/2.0;
    // calculate the reciprocal and scale up 16 bits and round
    double d = 1.00/(double)j * 65536 + 0.5;
    int s = int(d);
    // preserve 9 bits precision for the mantissa and 3 bits for the
    exponent.
    if (s < 512)
    {
        m[i] = s; // preserve 9 bits precision
        e[i] = 0; // encode -7 as 0
    }
    else if (s < 1024)
    {
        m[i] = s >> 1; // preserve 9 bits precision
        e[i] = 1;      // encode -6 as 1
    }
    else if (s < 2048)
    {
        m[i] = s >> 2; // preserve 9 bits precision
        e[i] = 2;      // encode -5 as 2
    }
    else if (s < 4096)
    {
        m[i] = s >> 3; // preserve 9 bits precision
        e[i] = 3;      // encode -4 as 3
    }
    else if (s < 8192)
    {
        m[i] = s >> 4; // preserve 9 bits precision
        3[i] = 4;      // encode -3 as 4
    }
    else if (s < 16384)
    {
        m[i] = s >> 5; // preserve 9 bits precision
        e[i] = 5;      // encode -2 as 5
    }
    else if (s < 32768)
    {
        m[i] = s >> 6; // preserve 9 bits precision
        e[i] = 6;      // encode -1 as 6
    }
    else
    {
        m[i] = s >> 7; // preserve 9 bits precision
        e[i] = 7;      // encode 0 as 7
    }
}
```

Table 1, below, shows the first four entries in the preferred look-up table 405. As discussed above, the first three entries have an error due to limited table width.

TABLE 1

| opacity | Correct mantissa | exponent | Approximate mantissa | Exponent |
|---|---|---|---|---|
| 0 | Infinite | 7 | 000 | 0 |
| 0.5 | 400 | 7 | 1FF | 7 |
| 1.0 | 200 | 7 | 1FF | 7 |
| 1.5 | 155 | 7 | 155 | 7 |

Figure 6:
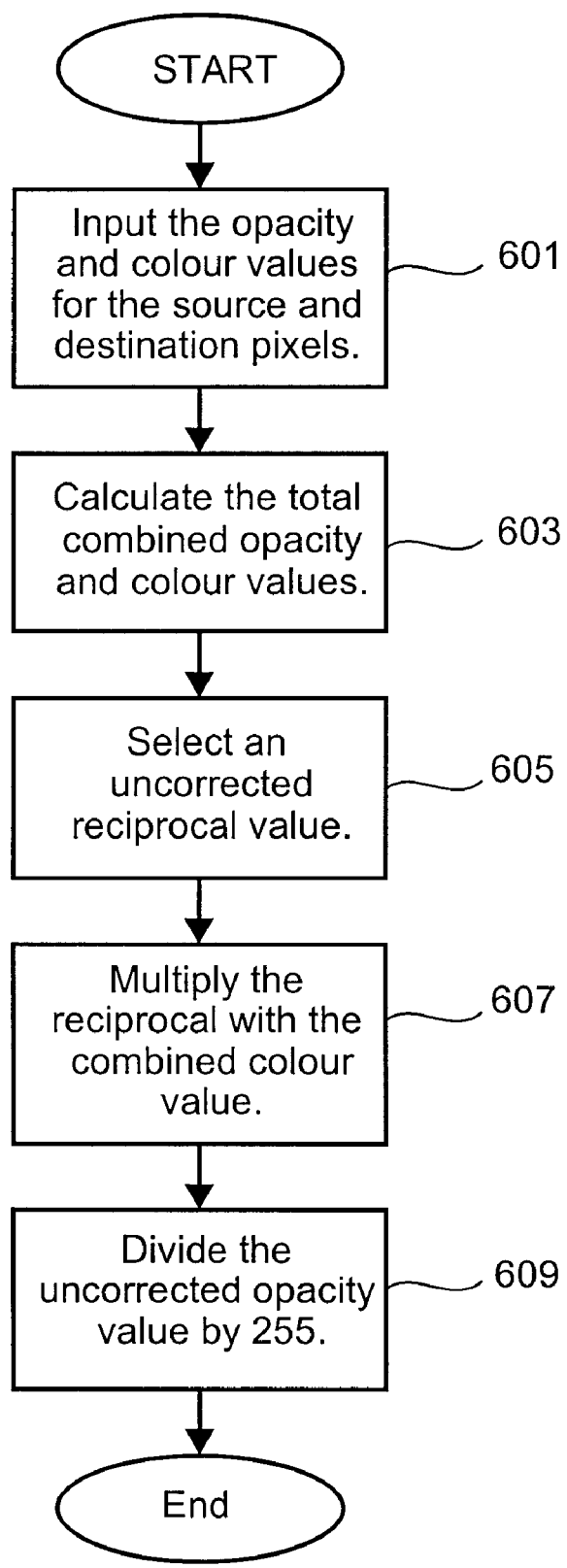
FIG. 6 is a flowchart showing a method of compositing a source and a destination pixel in accordance with the preferred embodiment.

FIG. 6 is a flowchart showing the method of compositing a source and a destination pixel in accordance with the preferred embodiment. The process begins at step 601, where the opacity and colour values for each of the source and destination pixels are received by the opacity combination system 313 and the colour combination system 315. At the next step 603, the total combined range uncorrected opacity and colour contributions for each of the three regions, SOUTD, DOUTS and SROPD are calculated. The process continues at the next step 605, where the uncorrected total combined opacity value is used to index the look-up table 405 in order to select a range uncorrected reciprocal value of the resultant opacity value, from a range of pre-stored range uncorrected reciprocal opacity values. At the next step 607, the selected reciprocal of the uncorrected resultant opacity value is multiplied with the combined range uncorrected colour value using the multiplier 407 to produce a resultant colour value. The process concludes at step 609, where the range uncorrected total combined opacity value is divided by 255 to produce a resultant range corrected opacity value.

The aforementioned preferred method comprises a particular control flow. There are many other variants of the preferred methods which use different control flows without departing the spirit or scope of the invention. Furthermore one or more of the steps of the preferred methods can be performed in parallel rather sequentially.

Figure 7:
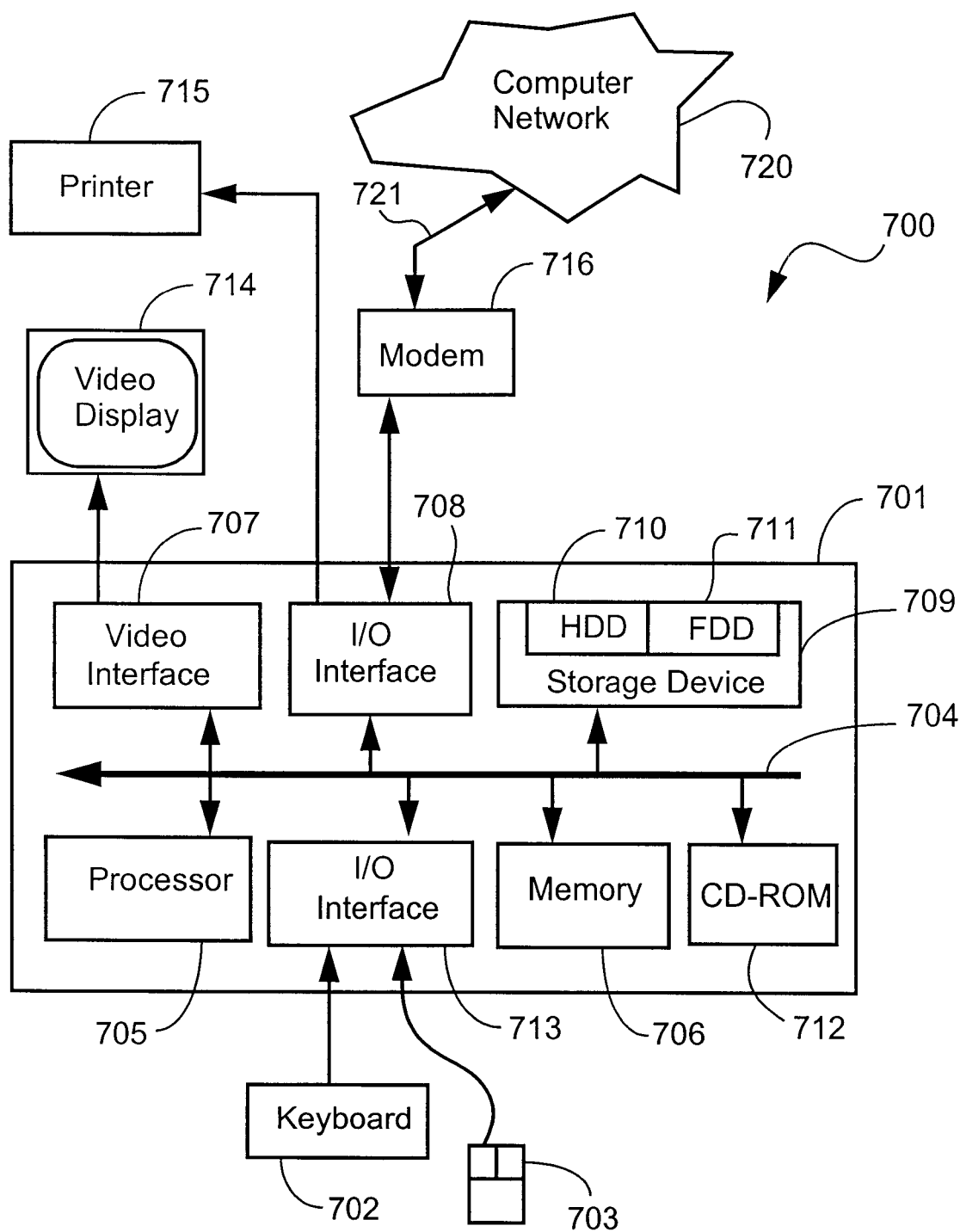
FIG. 7 is a schematic block diagram of a general purpose computer upon which the preferred embodiment of the present invention can be practiced.

Alternatively, the preferred embodiment can practiced using a conventional general-purpose computer system 700, such as that shown in FIG. 7 wherein the processes of FIG. 6 can be implemented as software, such as an application program executing within the computer system 700. In particular, the steps of method of FIG. 6 are effected by instructions in the software that are carried out by the computer. The software may be divided into two separate parts; one part for carrying out the compositing method; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for compositing pixel values in accordance with the embodiments of the invention.

The computer system 700 comprises a computer module 701, input devices such as a keyboard 702 and mouse 703, output devices including a printer 715 and a display device 714. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN).

The computer module 701 typically includes at least one processor unit 705, a memory unit 706, for example formed from semiconductor random access memory (RAM) and read only memory (ROM), input/output (I/O) interfaces including a video interface 707, and an I/O interface 713 for the keyboard 702 and mouse 703 and optionally a joystick (not illustrated), and an interface 708 for the modem 716. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable medium including magnetic tape, a ROM or integrated circuit, a magneto-optical disk, a radio or infra-red transmission channel between the computer module 701 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

What is claimed is:

1. An apparatus for compositing first and second pixel values, said apparatus comprising:
   logic means for calculating a combined range-uncorrected colour value using opacity and colour values for each of the first and second pixel values;
   further logic means for calculating a combined range-uncorrected opacity value for a third pixel using the opacity values for each of the first and second pixel values;
   selection means for selecting a reciprocal range-uncorrected opacity value from a plurality of predetermined reciprocal range-uncorrected opacity values, using the combined range-uncorrected opacity value;
   multiplier means for multiplying the reciprocal range-uncorrected opacity value with the combined range-uncorrected colour value to determine a final range-corrected resultant colour value for the third pixel; and
   divider means for accepting the combined range-uncorrected opacity value and dividing the combined range-uncorrected opacity value by a predetermined integer value to determine a final range-corrected resultant opacity value for the third pixel.

2. An apparatus according to claim 1, wherein said selection means comprises a look-up table.

3. An apparatus according to claim 1, further comprising a plurality of inputs for receiving the opacity and color values for each of the first and second pixel values.

4. An apparatus according to claim 1, further comprising:
   an arithmetic unit, adapted to perform arithmetic and raster operations on the color values for each of the first and second pixels; and
   buffer means for storing the final range-corrected resultant color and opacity values.

5. An apparatus according to claim 1, wherein the opacity and color values are represented as a plurality of bits.

6. An apparatus according to claim 1, wherein the opacity and color values are represented as eight-bit words.

7. An apparatus according to claim 1, wherein the predetermined integer value is 255.

8. An apparatus according to claim 1, wherein said divider means comprises an adder means for incrementing the combined range-uncorrected opacity value depending on the magnitude of the combined range-uncorrected opacity value.

9. An apparatus for compositing first and second pixel values, said apparatus comprising:
   a plurality of inputs for receiving opacity and color values for each of the first and second pixels;
   logic means for calculating a combined range-uncorrected color value using the opacity and color values;
   further logic means for calculating a combined range-uncorrected opacity value for a third pixel using the opacity values for each of the first and second pixel values;
   selection means for selecting a reciprocal range-uncorrected opacity value from a plurality of predetermined reciprocal range-uncorrected opacity values using the combined range-uncorrected opacity value;
   multiplier means for multiplying the reciprocal range-uncorrected opacity value with the combined range-uncorrected color value to produce a final range-corrected resultant color value for the third pixel; and
   divider means for accepting the combined range-uncorrected opacity value and dividing the combined range-uncorrected opacity value by a predetermined integer value, to determine a final range-corrected resultant opacity value for the third pixel.

10. An apparatus according to claim 9, wherein said selection means comprises a look-up table.

11. An apparatus according to claim 9, further comprising:
    an arithmetic unit, adapted to perform arithmetic and raster operations on the color values for each of the first and second pixels; and
    buffer means for storing the final range-corrected resultant color and opacity values.

12. An apparatus according to claim 9, wherein the opacity and color values are represented as a plurality of bits.

13. An apparatus according to claim 9, wherein the opacity and color values are represented as eight-bit words.

14. An apparatus according to claim 9, wherein the predetermined number is 255.

15. An apparatus according to claim 9, wherein said divider means comprises an adder means for incrementing the combined range-uncorrected opacity value depending on the magnitude of the combined range-uncorrected opacity value.

16. A method of compositing first and second pixel values, said method comprising the steps of:
    inputting opacity and color values for each of the first and second pixels;
    calculating a combined range-uncorrected color value using the opacity and color values;

calculating a combined range-uncorrected opacity value for a third pixel using the opacity values for each of the first and second pixel values;

selecting a range-uncorrected reciprocal opacity value from a plurality of predetermined range-uncorrected reciprocal opacity values using the combined range-uncorrected opacity value;

multiplying the range-uncorrected reciprocal opacity value with the combined range-uncorrected color value to produce a final range-corrected resultant color value for the third pixel; and dividing the combined range-uncorrected opacity value by a predetermined integer value to produce a final range-corrected resultant opacity value for the third pixel, wherein the final range-corrected resultant opacity value for the third pixel is determined subsequent to the combined range-uncorrected opacity value being calculated.

17. The method according to claim 16, comprising the further steps of:

performing arithmetic and raster operations on the color values for each of the first and second pixels; and storing the final range-corrected resultant color and opacity values.

18. The method according to claim 16, wherein the opacity and color values are represented as a plurality of bits.

19. The method according to claim 16, wherein the opacity and color values are represented as eight-bit words.

20. The method according to claim 16, wherein the predetermined number is 255.

21. The method according to claim 16, further comprising the step of incrementing the combined range-uncorrected opacity value depending on the magnitude of the combined range-uncorrected opacity value.

22. A computer readable medium, having a program recorded thereon, where the program is configured to make a computer execute a procedure to composite first and second pixel values, said program comprising:

code for inputting opacity and color values for each of the first and second pixels;

code for calculating a combined range-uncorrected color value using the opacity and color values;

code for calculating a combined range-uncorrected opacity value for a third pixel using the opacity values for each of the first and second pixel values;

code for selecting a range-uncorrected reciprocal opacity value from a plurality of predetermined range-uncorrected reciprocal opacity values using the combined range-uncorrected opacity value;

code for multiplying the range-uncorrected reciprocal opacity value with the combined range-uncorrected color value to produce a final range-corrected resultant color value for a third pixel; and code for dividing the combined range-uncorrected opacity value by a predetermined integer value to produce a final range-corrected resultant opacity value for the third pixel, wherein the final range-corrected resultant opacity value for the third pixel is determined subsequent to the combined range-uncorrected opacity value being calculated.

* * * * *

UNITED STATES PATENT AND TRADEMARK OFFICE
CERTIFICATE OF CORRECTION

PATENT NO. : 6,741,261 B2
APPLICATION NO. : 09/780467
DATED : May 25, 2004
INVENTOR(S) : Yu-Ling Chen It is certified that error appears in the above-identified patent and that said Letters Patent is hereby corrected as shown below:

ON THE TITLE PAGE [57] ABSTRACT:

Line 10, "a" should be deleted.

COLUMN 1:

Line 45, "it's" should read --its--;
Line 47, "it's" should read --its--;
Line 48, "it's" should read --its--; and
Line 51, "it's" should read --its--.

COLUMN 3:

Line 21, "said comprising" should read --said method comprising--.

COLUMN 4:

Line 45, "a" (second occurrence) should be deleted.

COLUMN 6:

Line 52, "entires" should read --entries--.

COLUMN 7:

Line 19, "// enough" should read --enough-- and
"these." should read --// these.--; and
Line 49, "3[i] = 4;" should read --e[i] = 4;--.

COLUMN 8:

Line 33, "departing the" should read --departing from the--; and
Line 36, "can practiced" should read --can be practiced--.

UNITED STATES PATENT AND TRADEMARK OFFICE
CERTIFICATE OF CORRECTION

PATENT NO. : 6,741,261 B2
APPLICATION NO. : 09/780467
DATED : May 25, 2004
INVENTOR(S) : Yu-Ling Chen It is certified that error appears in the above-identified patent and that said Letters Patent is hereby corrected as shown below:

COLUMN 9:

Line 43, "colour" (both occurrences) should read --color--;
Line 55, "colour" should read --color--; and
Line 56, "colour" should read --color--.

Signed and Sealed this

Twentieth Day of January, 2009

JON W. DUDAS
*Director of the United States Patent and Trademark Office*